(No Model)
W. KENNEDY.
PURIFIER FOR BLAST FURNACES.
No. 582,791. Patented May 18, 1897.
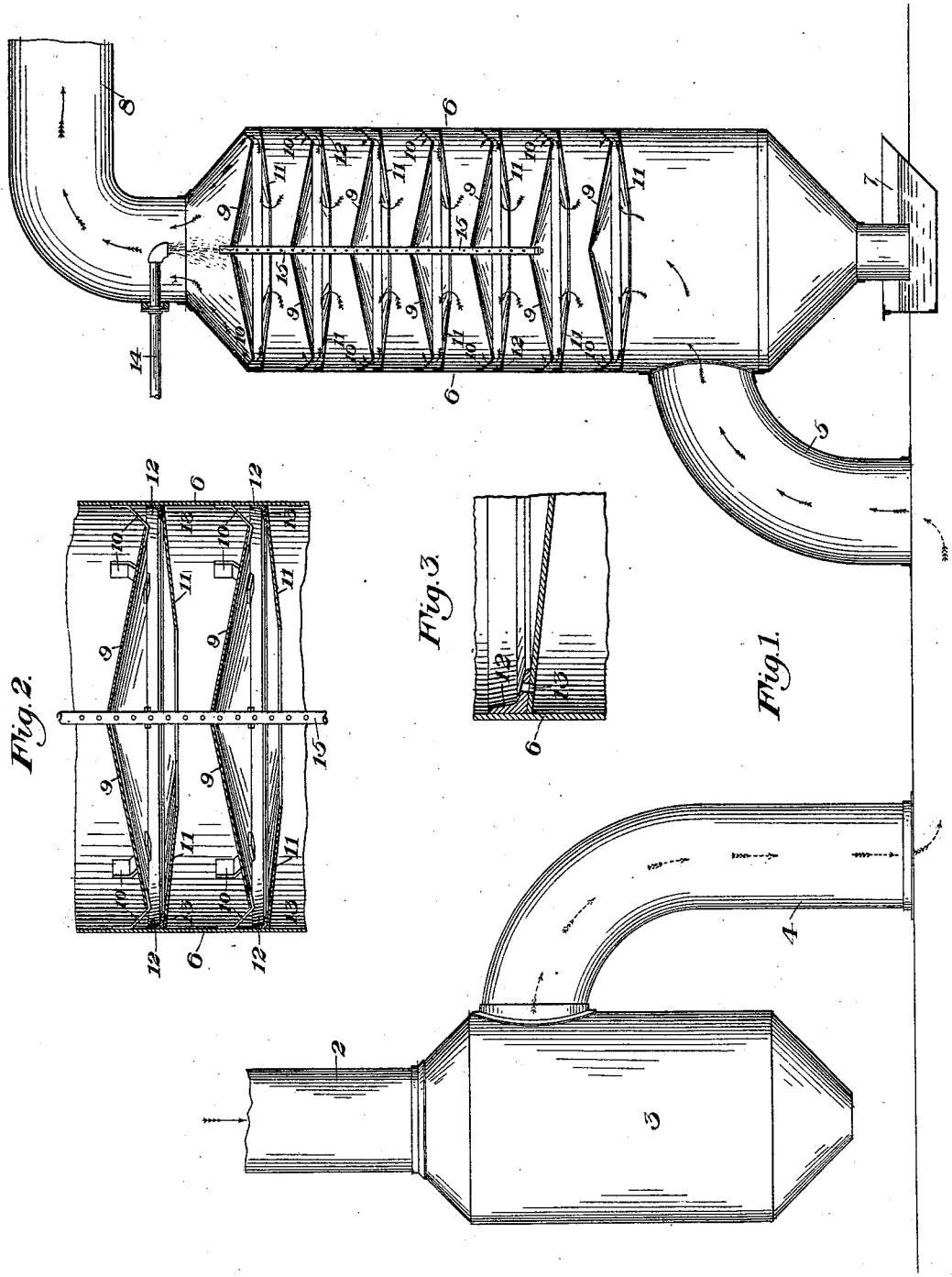
WITNESSES
INVENTOR

UNITED STATES PATENT OFFICE.

WALTER KENNEDY, OF PITTSBURG, PENNSYLVANIA.

PURIFIER FOR BLAST-FURNACES.

SPECIFICATION forming part of Letters Patent No. 582,791, dated May 18, 1897.

Application filed December 30, 1895. Serial No. 573,694. (No model.)

*To all whom it may concern:*

Be it known that I, WALTER KENNEDY, of Pittsburg, in the county of Allegheny and State of Pennsylvania, have invented a new and useful Improvement in Purifiers for Blast-Furnace Gases, of which the following is a full, clear, and exact description, reference being had to the accompanying drawings, forming a part of this specification, in which—

Figure 1 is a side elevation, showing the purifier in section, of the offtake of a blast-furnace provided with my invention; and Figs. 2 and 3 are enlarged details of portions of the purifier.

Heretofore wherever the purification of blast-furnace gases on their way to the stoves has been attempted the water has been applied in descending streams or sprays to the gases as they pass in a downward direction through the downcomer to the furnace. This system necessitated the use of a very large amount of water to prevent the absorbing of moisture, on account of the water being heated by the gases which passed in the same direction therewith. This difficulty is avoided by the use of my apparatus, in which the water flows in the opposite direction to that of the gas, in consequence of which a less amount of water may be used without its becoming heated, and the refuse particles are driven backward in opposition to the movement of the gases.

In the drawings, 2 represents the ordinary downcomer from the top of a blast-furnace, 3 the usual dust-collector, and 4 a pipe leading from the dust-collector to an underground conduit which is controlled by a suitable valve, such as the Spearman valve. From the underground conduit a pipe 5 leads the gases upwardly to the lower end of my improved purifier 6, which consists of a casing, preferably cylindrical, and provided with a water-sealed bottom which dips in the open-top vessel 7, the pipe 8 leading the purified gases from the upper end of the purifier to the hot-blast stoves. Within the purifier are supported a vertical series of cone-shaped deflectors 9, which are of less diameter than that of the casing and are supported from it by means of separated strips 10, thus leaving a series of annular spaces between the deflectors and the casing. Between these series of deflectors and arranged alternately therewith are a series of annular deflecting-plates 11, having central holes therein, these intermediate plates being secured to the casing by angle-strips 12, a series of small holes 13 being preferably provided near the outer edge of the plates. The water is introduced through a pipe 14, extending into the upper portion of the purifier, and falling upon the upper plate 9 flows outwardly in all directions toward the circumference, and falling upon the annular plate 11 flows inwardly, and dropping upon the next plate 9 continues in its downward course and falls into the receptacle 7. The gases rising through the pipe 5 pass upwardly in a serpentine course through the purifier, and being brought into intimate contact with the water in their passage are thoroughly cleaned and purified from metallic and other particles.

In order to prevent the central portions of the plates 9 from becoming heated, as the water in falling will strike between the center and the circumference of these plates, I provide the central vertical perforated pipe 15, having a closed lower end, a portion of the water from pipe 14 entering this vertical pipe and flowing outwardly over the central parts of the cone-plates, thus keeping such portions cooled. To prevent the gases from collecting beneath the outer portions of the intermediate plates 11, thus forming a hot-gas zone at such points and heating the plates, I provide the holes 13 above mentioned, which allow the gases to pass upwardly through the plates at such points.

The advantages of my invention will be apparent to those skilled in the art, since as the water passes in an opposite direction to that of the gases it is much less liable to become heated and enables a smaller amount of water to be used for the same work, while metallic and other particles are much more effectually removed, as they are driven backwardly in opposition to the current of gases and drop downwardly into the water-sealing receptacle.

Many variations may be made in the form and arrangement of the parts without departing from my invention, since

I claim—

1. A purifier having a series of cone-shaped deflecting-plates, and a vertical water-pipe extending through the series and having side perforations to allow the water to flow over the cones, substantially as described.

2. A purifier, having a vertical series of plates provided with apertures at their outer edges for the passage of gas, and a series of downwardly-inclined annular plates arranged alternately therewith, each plate of the second series having a free central hole for the passage of the current of gas, and being provided near its outer edge with small holes to allow the zone of gas accumulating beneath it to pass therethrough; substantially as described.

3. A purifier, having a vertical series of cone-shaped deflecting-plates, and a series of downwardly-inclined annular plates arranged alternately therewith, a gas-pipe leading into the bottom of the purifier, a vertical pipe extending through the cone-shaped plates and having side perforations, a water-pipe leading into the upper portion of the purifier, and an offtake leading from its upper end to the hot-blast stove, substantially as described.

In testimony whereof I have hereunto set my hand.

WALTER KENNEDY.

Witnesses:
G. I. HOLDSHIP,
H. M. CORWIN.